United States Patent
de Montmorillon et al.

(10) Patent No.: US 6,763,168 B2
(45) Date of Patent: Jul. 13, 2004

(54) OPTICAL FIBER FOR IN-LINE COMPENSATION OF CHROMATIC DISPERSION IN AN OPTICAL FIBER WITH POSITIVE CHROMATIC DISPERSION

(75) Inventors: Louis-Anne de Montmorillon, Paris (FR); Florent Beaumont, Conflans Ste Honorine (FR); Pascale Nouchi, Maisons Laffitte (FR); Pierre Sillard, Le Chesnay (FR); Maxime Gorlier, Paris (FR); Ludovic Fleury, Bois d'Arcy (FR)

(73) Assignee: Alcatel, Paris (FR)

( * ) Notice: Subject to any disclaimer, the term of this patent is extended or adjusted under 35 U.S.C. 154(b) by 106 days.

(21) Appl. No.: 09/983,519

(22) Filed: Oct. 24, 2001

(65) Prior Publication Data

US 2002/0076186 A1 Jun. 20, 2002

(30) Foreign Application Priority Data

Oct. 26, 2000 (FR) .......................................... 00 13724

(51) Int. Cl.$^7$ ................................................ G02B 6/22
(52) U.S. Cl. ...................................... 385/127; 385/123
(58) Field of Search ................................ 385/123, 124, 385/126, 127

(56) References Cited

U.S. PATENT DOCUMENTS 5,995,694 A    11/1999  Akasaka et al.
6,178,279 B1 *  1/2001  Mukasa et al. ............. 385/123
6,263,138 B1 *  7/2001  Sillard et al. ............... 385/123
6,421,490 B1 *  7/2002  Liu ............................ 385/127
6,470,126 B1 * 10/2002  Mukasa ...................... 385/123
6,490,397 B2 * 12/2002  Kato et al. .................. 385/123
2002/0012509 A1 *  1/2002  Mukasa ...................... 385/123
2002/0028051 A1 *  3/2002  Bickham et al. ............ 385/123

FOREIGN PATENT DOCUMENTS

EP    0 668 520 A2    8/1995
EP    1 030 199 A1    8/2000
WO    WO 99/42869    8/1999

OTHER PUBLICATIONS

Antos A J et al.: "Design and Characterization of Dispersion Compensating Fiber Based on the LP01 Mode" Journal of Lightwave Technology, IEEE. New York, US, vol. 12, No. 10; Oct. 1, 1994, pp. 1739–1744.

* cited by examiner

Primary Examiner—Akm Enayet Ullah
Assistant Examiner—Mike Stahl
(74) Attorney, Agent, or Firm—Sughrue Mion, PLLC

(57) ABSTRACT

At a wavelength of 1 550 nm an optical fiber has a chromatic dispersion from −12 to −4 ps/(nm.km) and a ratio of chromatic dispersion to chromatic dispersion slope from 250 to 370 nm. Its index profile comprises a rectangle or trapezium with a buried trench and a ring. An optical fiber transmission system uses this kind of fiber to compensate cumulative chromatic dispersion in a line fiber that has at a wavelength of around 1 550 nm a chromatic dispersion from 5 to 11 ps/(nm.km) and a ratio of chromatic dispersion to chromatic dispersion slope from 250 to 370 nm.

32 Claims, 1 Drawing Sheet

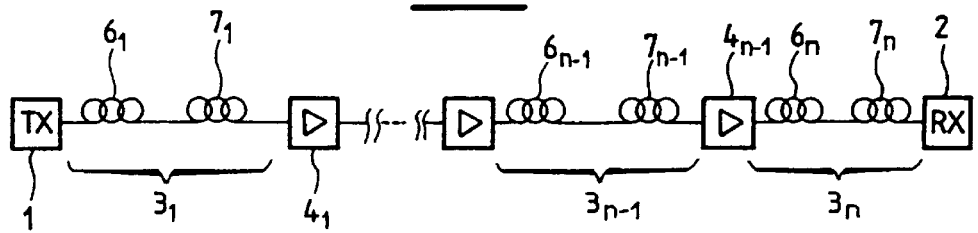
FIG_1
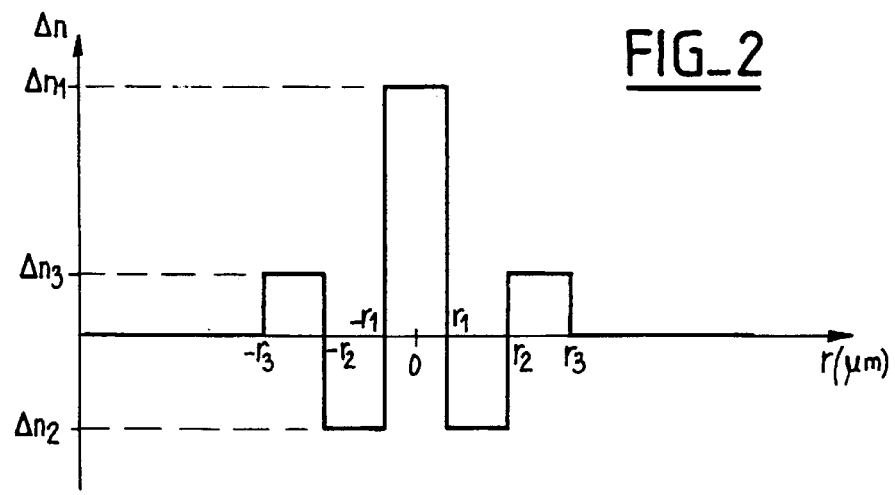
FIG_2
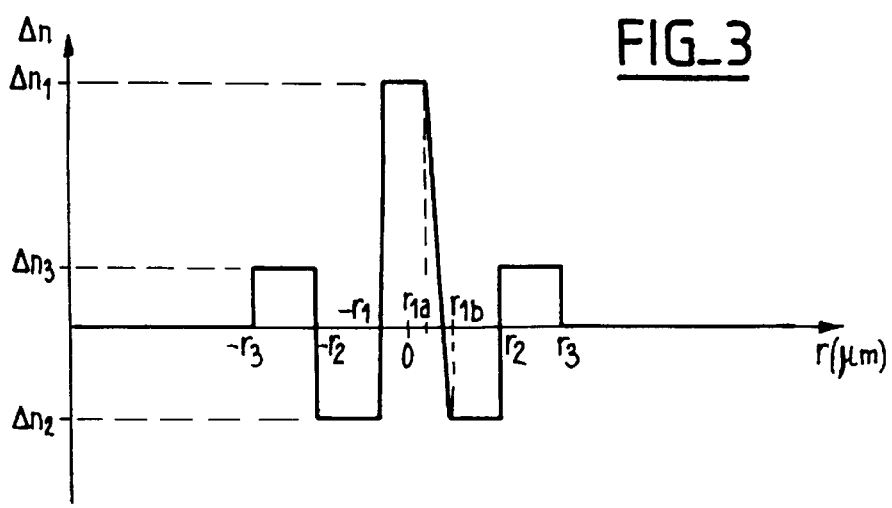
FIG_3

OPTICAL FIBER FOR IN-LINE COMPENSATION OF CHROMATIC DISPERSION IN AN OPTICAL FIBER WITH POSITIVE CHROMATIC DISPERSION

CROSS-REFERENCE TO RELATED APPLICATIONS

This application is based on French Patent Application No. 00 13 724 filed Oct. 26, 2000, the disclosure of which is hereby incorporated by reference thereto in its entirety, and the priority of which is hereby claimed under 35 U.S.C. §119.

BACKGROUND OF THE INVENTION

1. Field of the Invention
2. Description of the Prior Art

The present invention relates to optical fiber transmission and more specifically to compensating chromatic dispersion and chromatic dispersion slope in optical fiber transmission systems.

The index profile of optical fibers is generally described by the shape of the graph of the function that associates the refractive index of the fiber with its radius. It is conventional to plot the distance r from the center of the fiber on the abscissa axis and the difference between the refractive index and the refractive index of the cladding of the fiber on the ordinate axis. The expressions "step" index profile, "trapezium" index profile and "triangle" index profile are therefore used with reference to graphs that are respectively step-shaped, trapezium-shaped and triangular. These curves are generally representative of the theoretical or set point profile of the fiber and fiber fabrication constraints can yield a significantly different profile.

It is advantageous to manage chromatic dispersion in new high bit rate wavelength division multiplexed transmission networks, especially for bit rates greater than or equal to 40 Gbit/s or 160 Gbit/s; the objective, in order to limit pulse widening, is to obtain substantially zero cumulative chromatic dispersion over the link, for all wavelengths of the multiplex. A cumulative dispersion value of a few tens of ps/nm is generally acceptable. It is also beneficial to avoid, in the vicinity of wavelengths used in the system, zero values of the local chromatic dispersion, for which the non-linear effects are strongest. Furthermore, it is also beneficial to limit the cumulative chromatic dispersion slope over the range of the multiplex to prevent or limit distortion between multiplex channels. The chromatic dispersion slope is conventionally the derivative of chromatic dispersion with respect to wavelength.

Step index fibers, also known as single mode fibers (SMF), are conventionally used as line fibers in optical fiber transmission systems. The applicant's ASMF 200 step index monomode fiber has a chromatic dispersion cancellation wavelength $\lambda_0$ from 1 300 to 1 320 nm and a chromatic dispersion less than or equal to 3.5 ps/(nm.km) in a range from 1 285 to 1 330 nm and of the order of 17 ps/(nm.km) at 1 550 nm. The chromatic dispersion slope at 1 550 nm is of the order of 0.06 ps/(nm$^2$.km).

Dispersion shifted fibers (DSF) have also become available. At the transmission wavelength at which they are used, which is generally different from the wavelength of 1.3 μm for which the dispersion of silica is substantially zero, the chromatic dispersion is substantially zero; in other words, the non-zero chromatic dispersion of the silica is compensated—whence the use of the term "shifted"—by increasing the index difference Δn between the core of the fiber and the optical cladding. That index difference offsets the wavelength at which zero chromatic dispersion is obtained; it is achieved by introducing dopants into the preform, when fabricating the latter, for example by an MCVD process known in the art, and which is not described in more detail here.

Non-zero dispersion shifted fibers (NZ–DSF+) are dispersion shifted fibers having a positive non-zero chromatic dispersion at the wavelengths at which they are used, typically around 1 550 nm. At these wavelengths these fibers have a low chromatic dispersion, typically less than 11 ps/(nm.km) and a chromatic dispersion slope from 0.04 to 0.1 ps/(nm$^2$.km) at 1 550 nm.

The document FR-A2 790 107 proposes a line fiber especially suitable for dense wavelength division multiplex transmission with a channel spacing of 100 GHz or less for a bit rate per channel of 10 Gbit/s; at a wavelength of 1 550 nm, this fiber has an effective surface area greater than or equal to 60 μm$^2$, a chromatic dispersion from 6 to 10 ps/(nm.km), and a chromatic dispersion slope less than 0.07 ps/(nm$^2$.km).

French patent application number 00/02316 filed Feb. 24, 2000, whose title in translation is "An optical fiber exhibiting monomode behavior in-cable for wavelength division multiplex optical fiber transmission networks", proposes a line fiber which has, at a wavelength of 1 550 nm, a chromatic dispersion from 5 to 11 ps/(nm.km), a ratio of chromatic dispersion to chromatic dispersion slope from 250 to 370 nm and a ratio of the square of the effective surface area to the chromatic dispersion slope greater than 8×10$^4$ μm$^2$.nm$^2$.km/ps. This line fiber has a range of use from 1 300 to 1 625 nm. In one example described in the above application, its dispersion is compensated by dispersion compensating fiber having a chromatic dispersion of −100 ps/(nm.km) and a ratio of chromatic dispersion to chromatic dispersion slope of 260 nm.

Using short lengths of dispersion compensating fiber (DCF) to compensate chromatic dispersion and chromatic dispersion slope in SMF or NZ–DSF+ used as line fiber is known in the art. One example of a transmission system in which chromatic dispersion in an SMF line fiber is compensated using DCF is described in M. Nishimura et al., "Dispersion compensating fibers and their applications", OFC'96 Technical Digest ThA1. Such use of dispersion compensating fiber is also mentioned in L. Grüner-Nielsen et al., "Large volume Manufacturing of dispersion compensating fibers", OFC'98 Technical Digest TuD5. The drawbacks of this type of fiber are its high cost and its high sensitivity to PMD and to incorporation into a cable.

DCF are also described in various patents. In the vicinity of a wavelength of 1 550 nm they have a negative chromatic dispersion to compensate the cumulative chromatic dispersion in the line fiber, and can also have a negative chromatic dispersion slope to compensate the positive chromatic dispersion slope of the line fiber.

The documents U.S. Pat. Nos. 5,568,583 and 5,361,319 propose a DCF for compensating chromatic dispersion in an SMF which has a dispersion of the order of 17 ps/(nm.km) at 1550 nm.

The document WO-A-99 13366 proposes a dispersion compensating fiber that it is intended to be used in compensation modules to compensate the chromatic dispersion and the chromatic dispersion slope of a Lucent "True Wave" fiber; the fiber has a chromatic dispersion from 1.5 to 4 ps/(nm.km) and a chromatic dispersion slope of 0.07 ps/

(nm².km). One embodiment of the proposed dispersion compensating fiber has a chromatic dispersion of −27 ps/(nm.km) and a chromatic dispersion slope of −1.25 ps/(nm².km).

EP-A-0 674 193 proposes a dispersion compensating fiber having a chromatic dispersion from −85 to 20 ps/(nm.km); comparative examples of profiles with dispersion values from −20 to 0 ps/(nm.km) are proposed in the figures; the chromatic dispersion slope is positive or very weakly negative for these comparative examples.

U.S. Pat. No. 5,838,867 proposes a dispersion compensating fiber intended for in-line or in-module compensation of chromatic dispersion in a dispersion shifted line fiber.

K. Mukasa et al., "Novel network fiber to manage dispersion at 1.55 μm with combination of 1.3 μm zero dispersion single mode fiber", ECOC 97, Sep. 22–25, 1997, Conference publication No 448, proposes a Reverse Dispersion Fiber (RDF) which has chromatic dispersion and chromatic dispersion slope properties which are the inverse of those of an SMF line fiber. At 1 550 nm the fiber has a chromatic dispersion of −15.6 ps/(nm.km) and a chromatic dispersion slope of −0.046 ps/(nm².km), and thus a ratio of chromatic dispersion to chromatic dispersion slope of the order of 340 nm. It has a W-shaped index profile, with a peak at the center, surrounded by a trench which has a lower index than the cladding. In the above publication the RDF is used as line fiber, alternating with SMF: the cumulative chromatic dispersion and chromatic dispersion slope in an SMF section are compensated by the propagation in the next RDF section. This teaching is also set out in FR-A-2 761 483. The examples of profiles provided in that application are all step index profiles, in most cases with a buried cladding.

The invention proposes a new fiber which can be used to compensate chromatic dispersion in the fiber proposed in application No. 00/02316, previously cited. Compared to the fiber proposed in the Mukasa paper, it has lower attenuation and a larger effective surface area; it can be used more easily as line fiber in a transmission system. Also, the fiber of the invention can be used over a wider band than the fiber proposed in the Mukasa paper.

SUMMARY OF THE INVENTION

An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm.

The fiber of the invention can advantageously have one or more of the following propagation characteristics:
- at a wavelength of 1 550 nm, an effective surface area greater than 20 μm², and preferably greater than or equal to 30 μm²;
- at wavelengths from 1 300 nm to 1 620 nm, and preferably at wavelengths from 1 300 nm to 1 650 nm, bending losses less than or equal to 0.05 dB, and preferably less than or equal to 0.001 dB, after winding 100 turns around a 30 mm radius former;
- at wavelengths from 1 300 nm to 1 620 nm, and preferably at wavelengths from 1 300 nm to 1 650 nm, bending losses less than or equal to 100 dB/m, for a bending radius of 10 mm;
- at wavelengths from 1 300 nm to 1 620 nm, and preferably at wavelengths from 1 300 nm to 1 650 nm, a sensitivity to microbending less than or equal to 1, and preferably less than or equal to 0.5;
- at wavelengths from 1 300 nm to 1 620 nm, and preferably at wavelengths from 1 300 nm to 1 650 nm, an attenuation less than or equal to 0.30 dB/km and preferably less than or equal to 0.25 dB/km;
- an in-cable cut-off wavelength less than or equal to 1 400 nm, and preferably less than or equal to 1 300 nm;
- a polarization mode dispersion less than or equal to 0.1 ps.km$^{-1/2}$.

The fiber preferably has an index profile comprising a rectangle or a trapezium with a buried trench and a ring. The index profile can have the following features:
- the difference relative to the index of the cladding of the index of the trapezium or rectangle central part of said fiber is from $9.5 \times 10^{-3}$ to $11.6 \times 10^{-3}$ and the radius of the central part of said fiber whose index is higher than the index of said cladding is from 2.4 μm to 2.9 μm;
- the difference relative to the index of the cladding of the index of said buried trench is from $-6.9 \times 10^{-3}$ to $-3.1 \times 10^{-3}$ and the outside radius of said buried trench is from 4.8 μm to 6.9 μm;
- the difference relative to the index of the cladding of the index of said ring is from $1.5 \times 10^{-3}$ to $8.4 \times 10^{-3}$ and the outside radius of said ring is from 7.5 μm to 10.2 μm.

In the case of an index profile which has a trapezium central part, the ratio of the radius of the smaller base of said trapezium to the radius of the larger base of said trapezium is preferably from 0.8 to 1.

The fiber can also have an index profile comprising a trapezium with a buried trench and a ring with ratio of the radius of the smaller base of said trapezium to the radius of the larger base of said trapezium from 0.6 to 0.8. In this case the index profile can have the following features:
- the difference relative to the index of the cladding of the index of the trapezium central part of said fiber is from $9.8 \times 10^{-3}$ to $11.6 \times 10^{-3}$ and the radius of the central part of said fiber whose index is higher than the index of said cladding is from 2.5 μm to 2.9 μm;
- the difference relative to the index of the cladding of the index of said buried trench is from $-7.0 \times 10^{-3}$ to $-3.2 \times 10^{-3}$ and the outside radius of said buried trench is from 4.7 μm to 7.0 μm;
- the difference relative to the index of the cladding of the index of said ring is from $1.5 \times 10^{-3}$ to $8.5 \times 10^{-3}$ and the outside radius of said ring is from 7.5 μm to 10.2 μm.

The invention also proposes the use of a fiber of the above kind as dispersion compensating fiber in a wavelength division multiplex optical fiber transmission system. This fiber can be incorporated into a cable and used as line fiber.

The invention finally proposes a wavelength division multiplex optical fiber transmission system including a first section of line fiber and a second section of line fiber consisting of the fiber previously defined.

Advantageously, at a wavelength of 1 550 nm, said line fiber of said first section has a chromatic dispersion from 5 ps/(nm.km) to 11 ps/(nm.km), a chromatic dispersion slope from 0.01 ps/(nm².km) to 0.04 ps/(nm².km), an effective surface area from 50 μm² to 70 μm² and/or a ratio of chromatic dispersion to chromatic dispersion slope from 250 nm to 370 nm.

The ratio of the length of said first section to the length of said second section is preferably substantially the inverse of the absolute value of the ratio of the chromatic dispersions at a wavelength of 1 550 nm of said fibers of said first and second sections.

In one embodiment of the system, the cumulative chromatic dispersion at a wavelength from 1 450 nm to 1 620 nm, and preferably at a wavelength from 1 450 nm to 1 650 nm, is less than 100 ps/nm, and preferably less than 50 ps/nm, on average over 100 km of transmission.

BRIEF DESCRIPTION OF THE DRAWINGS

FIG. 1 is a diagrammatic representation of a transmission system according to the invention.

FIG. 2 is a diagrammatic representation of a set point index profile of a first embodiment of a fiber according to the invention.

FIG. 3 is a diagrammatic representation of a set point index profile of a second embodiment of a fiber according to the invention.

DETAILED DESCRIPTION OF THE PREFERRED EMBODIMENTS

The invention proposes a fiber which has at a wavelength of 1 550 nm a chromatic dispersion from −12 to −4 ps/(nm.km) and a ratio of chromatic dispersion to chromatic dispersion slope from 250 to 370 nm.

The fiber of the invention can be used as line fiber in a transmission system; it compensates chromatic dispersion and chromatic dispersion slope in a fiber of the kind proposed in application No. 00/02316, previously cited, i.e. a fiber having at a wavelength of 1 550 nm:

- a chromatic dispersion from 5 to 11 ps/(nm.km);
- a ratio of chromatic dispersion to chromatic dispersion slope from 250 to 370 nm;
- a chromatic dispersion slope from 0.01 to 0.04 ps/(nm².km); and
- an effective surface area from 50 to 70 $\mu m^2$.

In this kind of system, the fiber of the invention represents substantially half of the line fiber and the other half of the line fiber is the fiber described above.

FIG. 1 is a diagrammatic representation of a wavelength division multiplex transmission system in which the fiber of the invention is used as line fiber. FIG. 2 shows the transmitter TX 1 and the receiver RX 2 of the transmission system, with the line fiber between them. The line fiber is made up of sections $3_1$ to $3_n$ separated by repeaters $4_1$ to $4_{n-1}$; the structure of the repeaters has no impact on the invention and is not described in detail here. Between two adjacent repeaters $4_{i-1}$ and $4_i$, a section $3_i$ of line fiber consists of a first section $6_i$ of fiber of the type described in the French patent application previously cited and a second section $7_i$ of fiber according to the invention.

In one example, the fiber of the first section has at a wavelength of 1 550 nm a chromatic dispersion of 7.8 ps(nm.km) and a chromatic dispersion slope of 0.023 ps/(nm².km). The fiber of the second section is a fiber listed as fiber No. 3 in tables 1, 2 and 3 below and compensates cumulative chromatic dispersion in the first section of fiber over the range of wavelength of the multiplex: in this case, the fiber of the first section has a ratio of chromatic dispersion to chromatic dispersion slope of 340 nm and the fiber of the second section has a ratio of chromatic dispersion to chromatic dispersion slope of 340 nm.

The ratio of the respective lengths $L_1$ and $L_2$ of the fibers of the first and second sections is chosen to minimize cumulative chromatic dispersion on the link, and in this example can be of the order of 1, i.e. close to the opposite of the inverse of the ratio of the chromatic dispersions $C_1$ and $C_2$.

Examples of lengths are given for different transmission bands over a total length of 100 km. For use of the transmission system in the C band, from 1 530 to 1 565 nm (around 1 550 nm), a length $L_1$ of 51.38 km can be considered for the first fiber section, a length $L_2$ of 48.62 km can be considered for the second fiber section, consisting of fiber in accordance with the invention, and the cumulative chromatic dispersion for the 1 550 nm channel of the multiplex is close to 0 ps/nm. Throughout the C band, the absolute value of the cumulative chromatic dispersion is less than 1 ps/nm for each channel, over the total of 100 km that the first and second sections form.

If the transmission system is used in the C band and in the L band, i.e. from 1 530 to 1 620 nm, lengths $L_1$ of 51.34 km and $L_2$ of 48.66 km can be used. In this case, the cumulative chromatic dispersion for the 1 550 nm channel of the multiplex is close to 0 ps/nm. For the 1 590 nm channel, it is close to −1.4 ps/(nm.km). Over the whole of the band considered, the absolute value of cumulative chromatic dispersion over the 100 km remains less than 2 ps/nm.

If the transmission system is used in the S, C and L bands, i.e. from 1 450 to 1 620 nm, lengths $L_1$ of 53.04 km and $L_2$ of 46.96 km can be used. In this case, the cumulative chromatic dispersion for the 1 550 nm channel of the multiplex is close to 27 ps/nm. For the 1 590 nm channel, it is close to 29 ps/(nm.km). For the 1 475 nm channel, it is close to −6 ps/(nm.km). Over the whole of the band considered, the absolute value of cumulative chromatic dispersion over the 100 km remains less than 40 ps/nm.

Finally, for use of the transmission system in the S, C, L and XL bands, i.e. from 1 450 to 1 650 nm, lengths $L_1$ of 52.59 km and $L_2$ of 47.31 km can be used. In this case, the cumulative chromatic dispersion for the 1 550 nm of multiplex is close to 20 ps/nm. For the 1 590 nm channel, it is close to 21 ps/(nm.km). For the 1 475 nm channel, it is close to −12 ps/(nm.km). Finally, for the 1 635 nm channel, it is close to 31 ps/(nm.km). Over the whole of the band considered, the absolute value of cumulative chromatic dispersion over the 100 km remains less than 40 ps/nm.

In all cases, over the whole of the transmission band, the result of this is that cumulative chromatic dispersion is limited to values less than 100 ps/nm, or even 50 ps/nm, for each channel, on average, over 100 km, as indicated above.

Because of the good propagation characteristics of the fiber described in the patent application previously cited and the fiber of the invention, the invention can have losses per unit length less than 0.25 dB/km or even 0.23 dB/km; the effective surface area can be greater than 30 $\mu m^2$ over the whole of the link, which limits non-linear effects. Moreover, given the characteristics of the fiber, it is easy to obtain low polarization mode dispersion, typically less than or equal to 0.1 ps.km$^{-1/2}$.

The FIG. 1 embodiment is no more than an example, and is susceptible to variations. Thus the ratio of the lengths of the various sections of fiber can differ from the value of 1 proposed in the example. It is advantageous if the ratio has a value from 0.8 to 1.2. This range of values ensures, on the one hand, that the length of the negative dispersion fibers remains limited to values of the same order as that of the positive dispersion fiber, which limits the impact of the attenuation and the effective surface area of the negative dispersion fiber on the line as a whole. On the other hand, using greater lengths of compensating fiber than in the DCF habitually used enables dispersion to be compensated over a wider range of wavelengths. The range proposed is therefore a beneficial compromise.

In the example shown in the figure, each section has one section of fiber having positive chromatic dispersion followed by a section of fiber in accordance with the invention having negative chromatic dispersion; it is of course possible to alternate the positions of these two sections, or to provide a greater number of sections. It is nevertheless advantageous for the cumulative chromatic dispersion in the line fiber to be as close as possible to zero in the vicinity of the repeaters; this constitutes a possible constraint on the total length of positive chromatic dispersion fiber and on the total length of negative chromatic dispersion fiber between two adjacent repeaters. This kind of solution is not necessarily suitable, for example in the case where precompensation and postcompensation are applied to the signal, i.e. in cases where the signals transmitted are conditioned as a function of the chromatic dispersion expected on the link. Thus a compensation module can also be provided in the transmitter TX or in the receiver RX.

More generally, the number of sections of fiber of one kind or another between two repeaters depends on the acceptable value of cumulative chromatic dispersion at a point on the link. It is clear in the FIG. 1 example that there is maximum cumulative chromatic dispersion at the junction of the first and second sections, and that the maximum cumulative chromatic dispersion substantially corresponds to the cumulative chromatic dispersion over the first section. Replacing the two sections of lengths $L_1$ and $L_2$ with four sections of lengths $L_1/2$, $L_2/2$, $L_1/2$ and $L_2/2$ halves the maximum cumulative chromatic dispersion reached in the transmission system.

Finally, the values of chromatic dispersion proposed in the examples proposed above can be varied.

The examples consider transmission in the C band, in the C and L bands, in the S, C and L bands, and in the S, C, L and XL bands. Other transmission bands can be used, for example only the S band or only the L band, the C band and the S band, or any combination of the S, C, L and XL bands.

The use of a portion of the fiber in a repeater is not a preferred embodiment of the invention: nevertheless, there is no reason not to provide short lengths of this fiber in a repeater. The fiber of the invention can therefore be used to build very high bit rate wavelength division multiplex transmission systems and bit rates of N×20 Gb/s and N×40 Gb/s can be achieved over varied and large ranges of wavelength, for example.

The characteristics of the dispersion compensating fiber of the invention are described next, before describing one embodiment of the fiber. At a wavelength of 1 550 nm, the fiber has negative chromatic dispersion and negative chromatic dispersion slope, and can therefore compensate chromatic dispersion and chromatic dispersion slope in the fiber described in the French patent application previously cited. The chromatic dispersion is from –12 to –4 ps/(nm.km). The ratio of chromatic dispersion to chromatic dispersion slope can take a value from 250 to 370 nm.

It is also advantageous for the fiber to have one or more of the following characteristics:

an in-cable cut-off wavelength of 1 400 nm or even 1 300 nm;

an effective surface area greater than 20 $\mu m^2$, even 30 $mm^2$, at 1 550 nm;

bending losses, for 100 turns wound onto a 30 mm radius former, less than 0.05 dB for wavelengths from 1 300 to 1 620 nm, even from 1 300 to 1 650 nm;

bending losses, for a bending radius of 10 mm, less than or equal to 100 dB/m for wavelengths from 1 300 to 1 620 nm, and preferably from 1 300 to 1 650 nm;

sensitivity to microbending less than 1 for wavelengths from 1 300 to 1 620 nm, even from 1 300 to 1 650 nm;

attenuation less than 0.3 dB/km, even 0.25 dB/km;

polarization mode dispersion less than or equal to 0.1 $ps.km^{-1/2}$.

An in-cable cut-off wavelength less than 1 400 nm ensures monomode behavior for wavelengths greater than 1 400 nm, i.e. correct propagation of the light, e.g. the absence of mode noise that would otherwise greatly limit the bandwidth, in the fiber of the invention, in the S, C, L or XL bands useful for wavelength division multiplex transmission. An in-cable cut-off wavelength less than 1 300 nm ensures monomode behavior for wavelengths greater than 1 300 nm, i.e. correct propagation of the light in the fiber of the invention throughout the range of transparency of silica. Also, the higher the cut-off wavelength, the larger the effective surface area obtained, other things being equal (chromatic dispersion, chromatic dispersion slope and in-cable capability). Its value of effective surface area enables the fiber of the invention to be used as line fiber without losses or non-linear effects in the transmission system becoming excessive.

The bending losses are evaluated in a fashion known in the art by winding 100 turns of the fiber onto a 30 mm radius former and measuring the resulting losses; the limit on the bending losses ensures that the fiber of the invention withstands incorporation into a cable, as in the FIG. 1 embodiment. Another measuring method consists of winding the fiber into a 10 mm radius half-loop and measuring the resulting losses. In this latter case, the result is expressed in the form of a loss per unit length expressed in dB/m.

The sensitivity of the fiber to microbending is evaluated relative to the applicant's ASMF 200 fiber; the method of crushing the fiber between two grids, known to the person skilled in the art, can be used. The proposed value of sensitivity to microbending also improves the in-cable capability of the fiber. Limiting microbending losses limits the increments of attenuation of the fiber in the cable. This improves the behavior of the fiber when incorporated in the cable.

FIG. 2 is a diagrammatic representation of the set point index profile of a fiber according to the invention; in this embodiment, the index profile comprises a rectangle with a buried trench and a ring and has, starting from the center of the fiber:

a central part with a substantially constant index greater than or equal to the index of the cladding, and an annular part with an index less than or equal to the index of the cladding, the combination constituting a "rectangle with a buried or depleted trench" index profile.

Around the buried trench, the FIG. 2 fiber has a ring, i.e. a part whose index is higher than the index of the cladding, whence the expression "rectangle with a buried trench and a ring".

Values of the indices and radii for the FIG. 2 embodiment are set out in table 1. The central rectangle has a radius $r_1$ and the difference between its index and the index of the cladding is $\Delta n_1$. The buried trench lies between the radii $r_1$ and $r_2$ and the difference between its index and the index of the cladding is $\Delta n_2$. The ring around the trench lies between the radii $r_2$ and $r_3$; its index difference relative to the cladding is $\Delta n_3$. Around the ring is the cladding of the fiber, relative to which the index differences are measured. In the table the values of the radii are in $\mu m$ and the index values are multiplied by $10^3$.

TABLE 1

| No. | $r_1$ | $r_2$ | $r_3$ | $10^3 \times \Delta n_1$ | $10^3 \times \Delta n_2$ | $10^3 \times \Delta n_3$ |
|---|---|---|---|---|---|---|
| 1 | 2.53 | 5.20 | 9.83 | 11.1 | -4.7 | 1.8 |
| 2 | 2.79 | 5.44 | 8.18 | 10.2 | -6.4 | 4.3 |
| 3 | 2.79 | 6.06 | 7.61 | 9.9 | -5.4 | 8.3 |

In all cases the index variations relative to the cladding are from $-7 \times 10^{-3}$ to $12 \times 10^{-3}$; these choices ensure that the fiber remains simple to fabricate and that attenuation is limited.

The above values produce a fiber having the propagation characteristics set out in tables 2 and 3, in which:

$\lambda_{cth}$ is the theoretical cut-off wavelength in nm;

$S_{\it eff}$ is the effective surface area at 1 550 nm in $\mu m^2$;

C is the chromatic dispersion at 1 550 nm in ps/(nm.km);

C' is the chromatic dispersion slope at 1 550 nm in ps/(nm$^2$.km);

C/C' is the ratio of chromatic dispersion to chromatic dispersion slope at 1 550 nm, expressed in nm;

2W$_{02}$ is the mode diameter at 1 550 nm, expressed in $\mu m$;

PC30$_C$ is the value of the bending losses at 1 550 nm, expressed in dB, obtained with 100 turns of 30 mm radius;

PC30$_L$ is the value of the bending losses at 1 620 nm, expressed in dB, obtained with 100 turns of 30 mm radius;

PC30$_{XL}$ is the value of the bending losses at 1 650 nm, expressed in dB, obtained with 100 turns of 30 mm radius;

PC10$_C$ is the value of the bending losses at 1 550 nm, expressed in dB/m, obtained from the 10 mm radius half-loop test;

PC10$_L$ is the value of the bending losses at 1 620 nm, expressed in dB/m, obtained from the 10 mm radius half-loop test;

PC10$_{XL}$ is the value of the bending losses at 1 650 nm, expressed in dB/m, obtained from the 10 mm radius half-loop test;

$S_{\mu c}$ is the sensitivity to microbending at 1 550 nm.

TABLE 2

| No. | $\lambda_{cth}$ nm | $S_{eff}$ $\mu m^2$ | C ps/(nm · km) | C' ps/(nm$^2$ · km) | C/C' Nm | 2W$_{02}$ $\mu m$ |
|---|---|---|---|---|---|---|
| 1 | 1750 | 30.8 | -8.0 | -0.026 | 310 | 6.29 |
| 2 | 1750 | 34.2 | -8.4 | -0.034 | 250 | 6.53 |
| 3 | 1750 | 36.5 | -8.5 | -0.025 | 340 | 6.71 |

TABLE 3

| No. | PC30$_C$ dB | PC30$_L$ dB | PC30$_{XL}$ dB | PC10$_C$ dB/m | PC10$_L$ dB/m | PC10$_{XL}$ dB/m | $S_{\mu c}$ |
|---|---|---|---|---|---|---|---|
| 1 | <10$^{-5}$ | 1 × 10$^{-5}$ | 2 × 10$^{-4}$ | 1.1 | 13 | 31 | 0.25 |
| 2 | <10$^{-5}$ | 2 × 10$^{-5}$ | 2 × 10$^{-4}$ | 1.8 | 17 | 38 | 0.29 |
| 3 | <10$^{-5}$ | 6 × 10$^{-5}$ | 6 × 10$^{-4}$ | 3.1 | 25 | 52 | 0.38 |

Also, in the above examples, the values of chromatic dispersion are respectively -6.5, -5.8 and -6.5 ps/(nm.km) at 1 450 nm, and -11.1, -11.5 and -10.3 ps/(nm.km) at 1 650 nm.

The cut-off wavelength given here is the theoretical cut-off wavelength; it is the calculated wavelength beyond which only the fundamental mode can propagate (for more information on this see L. B. Jeunhomme, "Single-Mode Fiber Optics, principles and applications", 1990 edition, pages 39 to 44).

The in-cable cut-off wavelength is the cut-off wavelength measured on a 20 m long fiber (for more details, see the standard EIA/TIA-455-170). In practice, the in-cable cut-off wavelength is several hundred nm less than the theoretical cut-off wavelength; clearly the fiber is effectively mono-mode in the range of wavelengths of the wanted signals.

More generally, by varying the following parameters in the ranges indicated below, fibers are obtained having the characteristics of the invention and the set point profile shown in FIG. 2:

$9.5 \times 10^{-3} \leq \Delta n_1 \leq 11.6 \times 10^{-3}$ and $2.4 \ \mu m \leq r_1 \leq 2.9 \ \mu m$, and preferably:

$-6.9 \times 10^{-3} \leq \Delta n_2 \leq -3.1 \times 10^{-3}$ and $4.8 \ \mu m \leq r_2 \leq 6.9 \ \mu m$, and even more preferably:

$1.5 \times 10^{-3} \leq \Delta n_3 \leq 8.4 \times 10^{-3}$ and $7.5 \ \mu m \leq r_3 \leq 10.2 \ \mu m$.

Furthermore, the optimized profiles for obtaining the characteristics of the invention satisfy the following conditions, in which S, M1, M2, M3 and M4 are defined by the equation:

$$S = 2 \int_0^{r_1} \Delta n(r) \cdot r \cdot dr$$

$M_1 = S + K_1 \times r_2$, $K_1$ is a coefficient expressed in $\mu m$;

$M_2 = -r_2^2 \Delta n_2 + K_2 \times r_3$, $K_2$ is a coefficient expressed in $\mu m$;

$M_3 = -S + K_3 \times \Delta n_2$, $K_3$ is a coefficient expressed in $\mu m^2$;

$M_4 = -r_2^2 \Delta n_2 + K_4 \times \Delta n_3$, $K_4$ is a coefficient expressed in $\mu m^2$;

$63.9 \times 10^{-3} \ \mu m^2 \leq S \leq 81.7 \times 10^{-3} \ \mu m^2$ $-201 \times 10^{-3} \ \mu m^2 \leq (r_2)^2 \times \Delta n_2 \leq -121 \times 10^{-3} \ \mu m^2$ $7.0 \times 10^{-3} \ \mu m \leq (r_3 - r_2) \times \Delta n_3 \leq -13.0 \times 10^{-3}$ $131 \times 10^{-3} \ \mu m^2 \leq M_1 \leq 154 \times 10^{-3} \ \mu m^2$ where $K_1 = 12.3 \ \mu m$ $291 \times 10^{-3} \ \mu m^2 \leq M_2 \leq 339 \times 10^{-3} \ \mu m^2$ where $K_2 = 18.2 \ \mu m$ $53.1 \times 10^{-3} \ \mu m^2 \leq M_3 \leq 67.7 \times 10^{-3} \ \mu m^2$ where $K_3 = 2.7 \ \mu m^2$ $-156 \times 10^{-3} \ \mu m^2 \leq M_4 < -85.9 \times 10^{-3} \ \mu m^2$ where $K_4 = 8.5 \ \mu m^2$ FIG. 3 is a diagrammatic representation of the set point index profile of a second embodiment of a fiber according to the invention. The index profile comprises a trapezium with a buried trench and a ring. The only difference between this profile and that shown in FIG. 2 lies in the fact that the central part is in the shape of a trapezium, and not a rectangle, with a minimum radius $r_{1a}$, a maximum $r_{1b}$ and a radius $r_1$ corresponding to the radius of the central part at the point where it crosses the abscissa axis. The central part of radius $r_{1a}$ and of constant index higher than the index of the cladding can also be referred as the "smaller base of the trapezium". The "larger base of the trapezium" corresponds to the radius $r_{1b}$ in the figure, and extends as far as the inside radius of the buried trench.

The parameters and characteristics of a fiber according to the invention having a FIG. 3 type profile are set out in tables 4, 5 and 6 below. The respective notations are the same as in tables 1 to 3 above.

TABLE 4

| No. | $r_{1a}/r_{1b}$ | $r_1$ | $r_2$ | $r_3$ | $10^3 \times \Delta n_1$ | $10^3 \times \Delta n_2$ | $10^3 \times \Delta n_3$ |
|---|---|---|---|---|---|---|---|
| 1 | 0.66 | 2.77 | 4.95 | 9.27 | 11.35 | −6.35 | 2.05 |
| 2 | 0.92 | 2.79 | 5.92 | 7.84 | 10.1 | −5.2 | 6.3 |

TABLE 5

| No. | $\lambda_{cth}$ (nm) | $S_{eff}$ ($\mu m^2$) | C (ps/nm/km) | C' (ps/nm²/km) | C/C' (nm) | $2W_{02}$ ($\mu m$) |
|---|---|---|---|---|---|---|
| 1 | 1726 | 30.3 | −8.3 | −0.029 | 285 | 6.24 |
| 2 | 1752 | 35.3 | −7.7 | −0.0245 | 316 | 6.64 |

TABLE 6

| No. | $PC30_C$ dB | $PC30_L$ dB | $PC30_{XL}$ dB | $PC10_C$ dB/m | $PC10_L$ dB/m | $PC10_{XL}$ dB/m | $S_{\mu c}$ |
|---|---|---|---|---|---|---|---|
| 1 | $<10^{-5}$ | $<10^{-5}$ | $8 \times 10^{-5}$ | 0.6 | 8 | 20 | 0.22 |
| 2 | $<10^{-5}$ | $2 \times 10^{-5}$ | $2 \times 10^{-4}$ | 1.6 | 14 | 31 | 0.31 |

Also, in these examples, the values of chromatic dispersion are respectively −6.5 and −5.9 ps/(nm.km) at 1 450 nm and −11.7 and −9.8 ps/(nm.km) at 1 650 nm.

The ranges of radii and indices defined below for the FIG. 2 index profile comprising a rectangle with a buried trench and a ring apply equally to the FIG. 3 index profile (taking for $r_1$ a new definition given above). The above ranges are advantageously complemented by a range for defining the ratio $r_{1a}/r_{1b}$:

$$0.8 \leq r_{1a}/r_{1b} \leq 1$$

in which the ratio equal to 1 corresponds to the rectangle situation.

A profile can also be used with a trapezium having even more steeply inclined flanks. In this case, it is advantageous for the profile to satisfy the following laws:

$$0.6 \leq r_{1a}/r_{1b} \leq 0.8,$$

$$9.8 \times 10^{-3} \leq \Delta n_1 \leq 11.6 \times 10^{-3} \text{ and } 2.5 \, \mu m \leq r_1 \leq 2.9 \, \mu m,$$

and preferably:

$$-7.0 \times 10^{-3} \leq \Delta n_2 \leq -3.2 \times 10^{-3} \text{ and } 4.7 \, \mu m \leq r_2 \leq 7.0 \, \mu m,$$

and even more preferably:

$$1.5 \times 10^{-3} \leq \Delta n_3 \leq 8.5 \times 10^{-3} \text{ and } 7.5 \, \mu m \leq r_3 \leq 10.2 \, \mu m.$$

Also, the optimized profiles for obtaining the characteristics of the invention verify the following conditions, in which S, $N_1$, $N_2$, $N_3$ and $N_4$ are defined by the equation:

$$S = 2 \int_0^{r_1} \Delta n(r) \cdot r \cdot dr$$

$N_1 = S + Q_1 \times r_2$, $Q_1$ is a coefficient expressed in $\mu m$;

$N_2$ par $N_2 = -r_2^2 \Delta n_2 + Q_2 \times r_3$, $Q_2$ is a coefficient expressed in $\mu m$;

$N_3$ par $N_3 = S + Q_3 \times \Delta n_2$, $Q_3$ is a coefficient expressed in $\mu m$;

$N_4$ par $N_4 = -r_2^2 \Delta n_2 + Q_4 \times \Delta n_3$, $Q_4$ is a coefficient expressed in $\mu m$:

$64.0 \times 10^{-3} \, \mu m^2 \leq S \leq 76.0 \times 10^{-3} \, \mu m^2$ $-197 \times 10^{-3} \, \mu m^2 \leq (r_2)^2 \times \Delta n_2 \leq -128 \times 10^{-3} \, \mu m^2$ $7.1 \times 10^{-3} \, \mu m \leq (r_3 - r_2) \times \Delta n_3 \leq -13.0 \times 10^{-3}$ $104.5 \times 10^{-3} \, \mu m^2 \leq N_1 \leq 121.5 \times 10^{-3} \, \mu m^2$ where $Q_1 = 8.0 \, \mu m$ $292 \times 10^{-3} \, \mu m^2 \leq N_2 \leq 335 \times 10^{-3} \, \mu m^2$ where $Q_2 = 17.6 \, \mu m$ $49.5 \times 10^{-3} \, \mu m^2 \leq N_3 \leq 60.5 \times 10^{-3} \, \mu m^2$ where $Q_3 = 2.45 \, \mu m^2$ $-159 \times 10^{-3} \, \mu m^2 \leq N_4 \leq -91 \times 10^{-3} \, \mu m^2$ where $Q_4 = 8.8 \, \mu m^2$ The fiber of the invention can be fabricated by the person skilled in the art, using techniques known in the art, such as the MCVD, OVD and other techniques routinely used to fabricate optical fibers.

Of course, the present invention is not limited to the examples and embodiments described and shown, but is susceptible to many variants that will be evident to the skilled person. It is clear that the FIGS. 2 and 3 profiles and the examples of radii and indices are given by way of example only, and that other profiles can produce fibers having the characteristics of the invention. The fiber of the invention can be used as in the FIG. 1 embodiment in a transmission system with repeaters but also in a transmission system without repeaters.

There is claimed:

1. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has, at a wavelength of 1 550 nm, an effective surface area greater than 20 $\mu m^2$.

2. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has, at wavelengths from 1 300 nm to 1 620 nm, bending losses less than or equal to 0.05 dB, after winding 100 turns around a 30 mm radius former.

3. An optical fiber which has, at a wavelength of 1 550 a chromatic dispersion from −12 ps/(nm.km) to −4 ps/(nm.km) and a ratio of chromatic dispersion to chromatic dispersion slope from 250 nm to 370 nm; and which has, at wavelengths from 1 300 nm to 1 620 nm, bending losses less than or equal to 100 dB/m, for a bending radius of 10 mm.

4. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has, at wavelengths from 1 300 nm to 1 620 nm, a sensitivity to microbending less than or equal to 1.

5. An optical fiber which has, at a wavelength of 1 550 nm, a chromatic dispersion from −12 ps/(nm.km) to −4 ps(nm.km) and a ratio of chromatic dispersion to chromatic dispersion slope from 250 nm to 370 nm; and which has, at wavelengths from 1 300 nm to 1 620 nm, an attenuation less than or equal to 0.30 dB/km.

6. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has an in-cable cut off wavelength less than or equal to 1 400 nm.

7. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has a polarization mode dispersion less than or equal to 0.1 ps.km$^{-1/2}$.

8. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has an index profile comprising a rectangle or a trapezium with a buried trench and a ring; and in which the difference relative to the index of the cladding of the index of the trapezium or rectangle central part of said fiber is from $9.5 \times 10^{-3}$ to $11.6 \times 10^{-3}$ and in which the radius of the central part of said fiber whose index is higher than the index of said cladding is from 2.4 μm to 2.9 μm.

9. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has an index profile comprising a rectangle or a trapezium with a buried trench and a ring; and in which the difference relative to the index of the cladding of the index of said buried trench is from $-6.9 \times 10^{-3}$ to $-3.1 \times 10^{-3}$ and in which the outside radius of said buried trench is from 4.8 μm to 6.9 μm.

10. An optical fiber which has, at a wavelength 1 550 nm, a chromatic dispersion from −12 ps/(nm.km) to −4 ps/(nm.km) and a ratio of chromatic dispersion to chromatic dispersion slope from 250 nm to 370 nm; and which has an index profile comprising a rectangle or a trapezium with a buried trench and a ring; and in which the difference relative to the index of the cladding of the index of said ring is from $1.5 \times 10^{-3}$ to $8.4 \times 10^{-3}$ and in which the outside radius of said ring is from 7.5 μm to 10.2 μm.

11. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and which has an index profile comprising a central trapezium with a buried trench and a ring; and in which the ratio of the radius of the smaller base of said trapezium to the radius of the larger base of said trapezium is from 0.8 to 1.

12. An optical fiber which has, at a wavelength 1 550 nm, a chromatic dispersion from −12 ps/(nm.km) to −4 ps/(nm.km) and a ratio of chromatic dispersion to chromatic dispersion slope from 250 nm to 370 nm; and which has index profile comprising a trapezium with a buried trench and a ring and in which the ration of the radius of the smaller base of said trapezium to the radius of the larger base of said trapezium is from 0.6 to 0.8.

13. The fiber claimed in claim 12, in which the difference relative to the index of the cladding of the index of the trapezium central part of said fiber is from $9.8 \times 10^{-3}$ to $11.6 \times 10^{-3}$ and in which the radius of the central part of said fiber whose index is higher than the index of said cladding is from 2.5 μm to 2.9 μm.

14. The fiber claimed in claim 12, in which the difference relative to the index of the cladding of the index of said buried trench is from $-7.0 \times 10^{-3}$ to $-3.2 \times 10^{-3}$ and in which the outside radius of said buried trench is from 4.7 μm to 7.0 μm.

15. The fiber claimed in claim 12, in which the difference relative to the index of the cladding of the index of said ring is from $1.8 \times 10^{-3}$ to $8.5 \times 10^{-3}$ and in which the outside radius of said ring is from 7.5 μm to 10.2 μm.

16. A method of compensating chromatic dispersion, comprising the steps of:

using the fiber of claim 5 as dispersion compensating fiber in a wavelength division multiplex optical fiber transmission system.

17. A method of compensating chromatic dispersion, comprising the steps of:

using the fiber of claim 5 as a dispersion compensating fiber incorporated into a cable as line fiber.

18. A wavelength division multiplex optical fiber transmission system including a first section of line fiber and a second section of line fiber as claimed in claim 5.

19. The transmission system claimed in claim 18, in which said line fiber of said first section has a chromatic dispersion from 5 ps/(nm.km) to 11 ps/(nm.km) at a wavelength of 1 550 nm.

20. The transmission system claimed in claim 18, which said line fiber of said first section has a chromatic dispersion slope from 0.01 ps/(nm$^2$.km) to 0.04 ps/(nm$^2$.km) at a wavelength of 1 550 nm.

21. The transmission system claimed in claim 18, in which said line fiber of said first section has an effective surface area from 50 μm$^2$ to 70 μm$^2$ at a wavelength of 1 550 nm.

22. The transmission system claimed in claim 18, in which said line fiber of said first section has a ratio of chromatic dispersion to chromatic dispersion slope from 250 nm to 370 nm at a wavelength of 1 550 nm.

23. The transmission system claimed in claim 18, in which the ratio of the length of said first section to the length of said second section is substantially the inverse of the absolute value of the ratio of the chromatic dispersions at a wavelength of 1 550 nm of said first and second sections.

24. The transmission system claimed in claim 18, in which the cumulative chromatic dispersion at a wavelength from 1 450 nm to 1 620 nm is less than 100 ps/nm on average over 100 km of transmission.

25. The fiber claimed in claim 1, wherein the fiber has, at a wavelength of 1 550 nm, an effective surface area greater than or equal to 30 m$^2$.

26. An optical fiber which has, at a wavelength of 1 550 nm, a chromatic dispersion from −12 ps/(nm.km) to −4 ps/(nm.km) and a ratio of chromatic dispersion to chromatic dispersion slope from 250 nm to 370 nm; and wherein the fiber has, at wavelengths from 1,300 nm to 1,650 nm, bending losses less than or equal to 0.001 dB after winding 100 turns round a 30 mm radius former.

27. The fiber claimed in claim 9, wherein the fiber has, at wavelengths from 1,300 nm to 1,650 nm, bending losses less than or equal to 100 dB/m, for a bending radius of 10 mm.

28. The fiber claimed in claim 4, wherein the fiber has, at wavelengths from 1,300 nm to 1,650 nm, a sensitivity to microbending less than or equal to 0.5.

29. The fiber claimed in claim 5, wherein the fiber has, at wavelengths from 1,300 nm to 1,650 nm, an attenuation less than or equal to 0.25 dB/km.

30. The fiber claimed in claim 6, wherein the fiber has an in cable cut-off wavelength loss than or equal to 1,300 nm.

31. The transmission system claim in claim 18 in which the cumulative chromatic dispersion at a wavelength from 1,450 nm to 1,650 nm, is less than 50 ps/nm on average over 100 km of transmission.

32. An optical fiber which has, at a wavelength of 1 550 nm, a chromatic dispersion between −8.5 ps/(nm.km) and −4 ps/(nm.km) and a ratio of chromatic dispersion to chromatic dispersion slope from 250 nm to 370 nm,.

* * * * *